Figure 3:
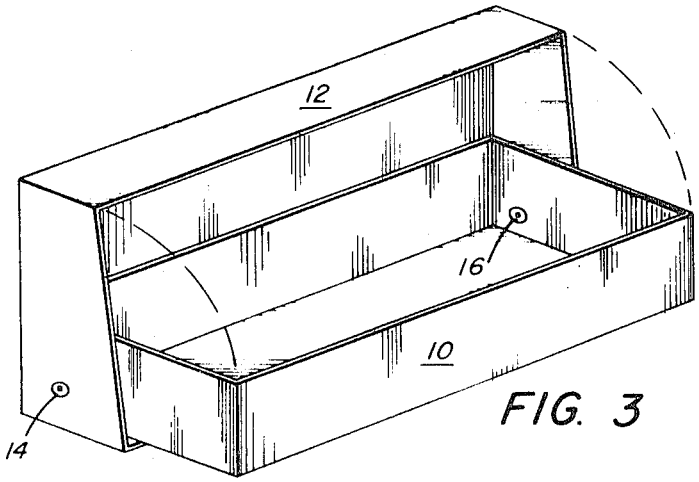
Figure 1:
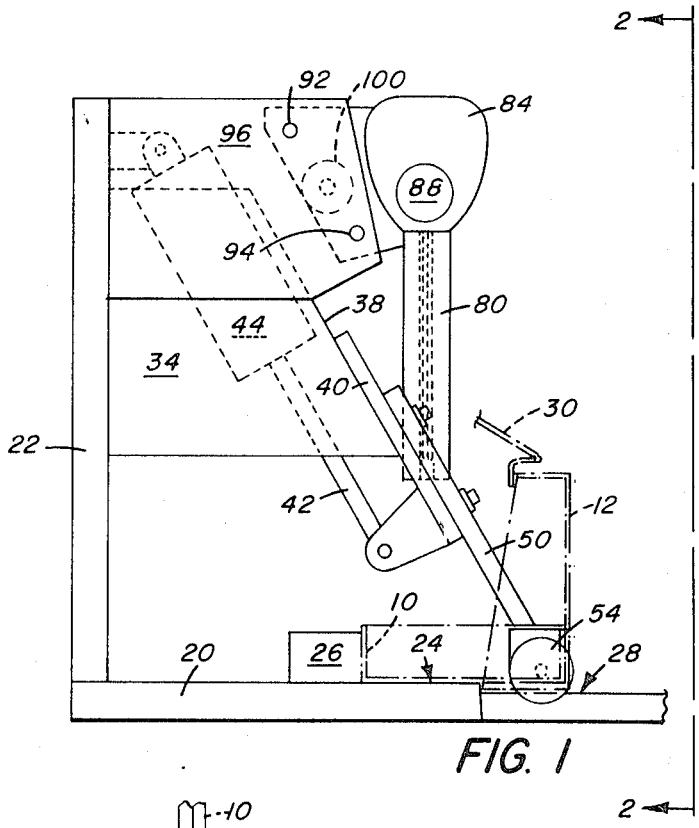
Figure 4:
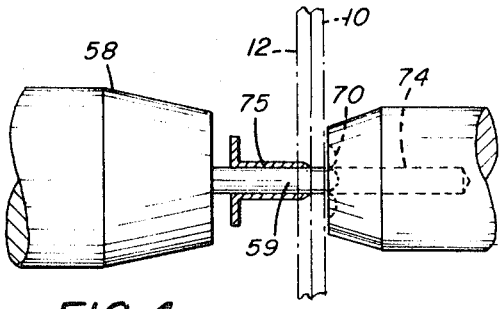
Figure 2:
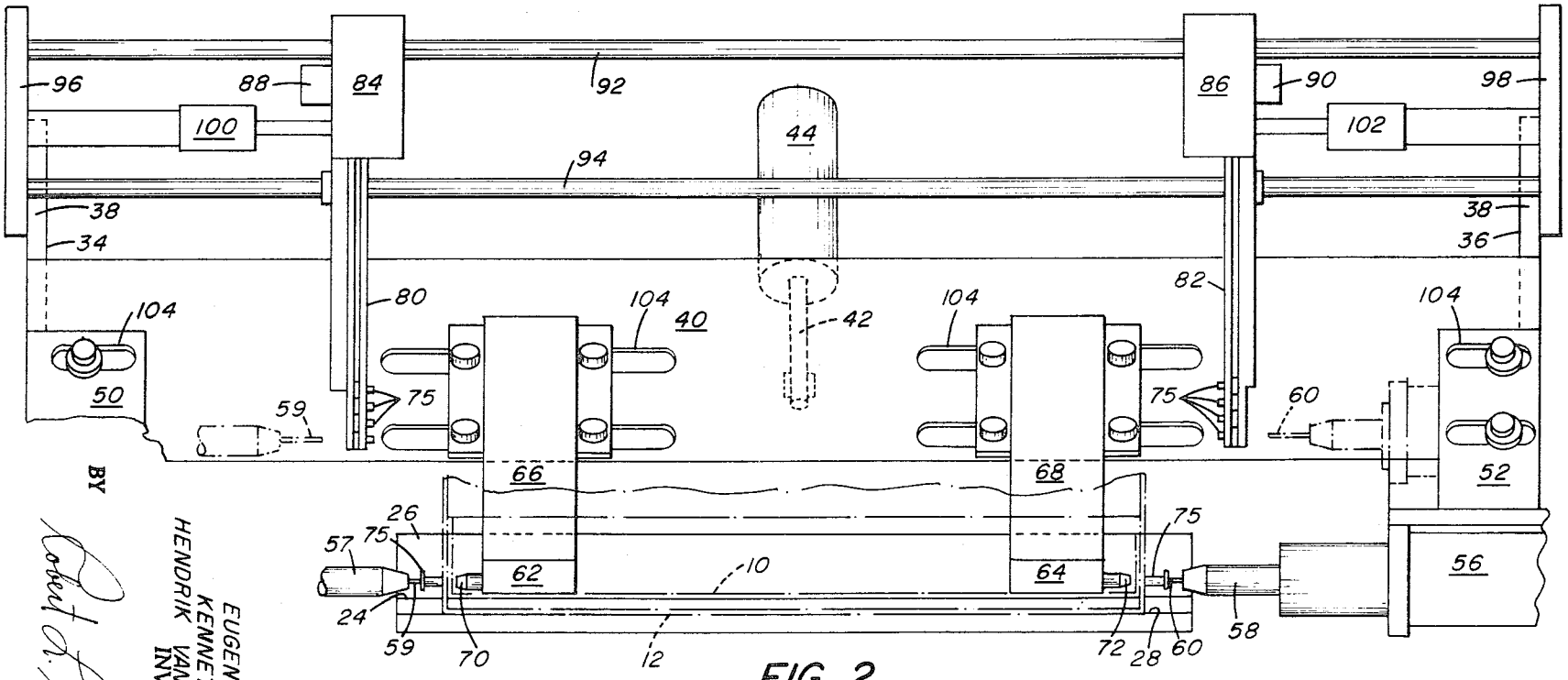

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 982

T890,014
HORIZONTAL EYELETER

Eugene Lemieux, Albion, and Kenneth N. Ross and Hendrik Vandermeulen, Rochester, N.Y. (all of 1669 Lake Ave., Rochester, N.Y. 14650)

Filed Mar. 1, 1971, Ser. No. 120,012
Int. Cl. B21j *15/02, 15/14*
U.S. Cl. 29—526
2 Sheets Drawing. 17 Pages Specification

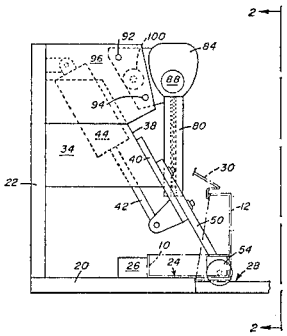

Method and apparatus for horizontally inserting eyelets comprising a horizontally operable ram member having a horizontally disposed spindle at one end thereof. An anvil member is arranged in horizontal spaced alignment with the spindle. The ram member and the anvil member are mounted on a frame member arranged for movement between a first retracted position and a second fastener-setting position in a direction transverse to the horizontal motion of the ram member, with the ram member and the anvil member being maintained in alignment throughout their movement between the first and second positions. An eyelet supply means, including a track means, extends between the ram member and the anvil member when they are in the first position with the track means arranged to present an eyelet in alignment with the spindle. The eyelet supply means is arranged to horizontally move the track means toward the ram member to engage the eyelet in the track means with the spindle, and then to return the track means to the original position when the ram member and the anvil member are in the second position. The track member is arranged to release the eyelet engaged by said spindle upon movement of the spindle towards the second position. The ram member and the anvil member are disposed on opposite sides of the article when they are in the second position. The ram member is then driven toward the anvil member to drive the spindle and the eyelet through the article and to impact the eyelet on the anvil member to set the eyelet in the article. The ram member and spindle are then retracted from the anvil member and the ram member and anvil member are returned to the first position.

HORIZONTAL EYELETER

Filed March 1, 1971 2 Sheets-Sheet 1

EUGENE LEMIEUX
KENNETH N. ROSS
HENDRIK VANDERMEULEN
INVENTORS

BY Robert L. Landell
ATTORNEY

HORIZONTAL EYELETER

Filed March 1, 1971 2 Sheets-Sheet 2

EUGENE LEMIEUX
KENNETH N. ROSS
HENDRIK VANDERMEULEN
INVENTORS

BY Robert L. Landell

ATTORNEY